(12) United States Patent
Broda et al.

(10) Patent No.: US 10,165,521 B2
(45) Date of Patent: Dec. 25, 2018

(54) INFORMATION COMMUNICATION SYSTEM

(71) Applicant: EMERGENCY WARNING SYSTEMS LIMITED, Melbourne, Victoria (AU)

(72) Inventors: Martin Broda, Wantirna South (AU); Ivan Carter, Diamond Creek (AU)

(73) Assignee: Emergency Warning Systems Limited, Melbourne, Victoria (AU)

( * ) Notice: Subject to any disclaimer, the term of this patent is extended or adjusted under 35 U.S.C. 154(b) by 0 days.

(21) Appl. No.: 15/111,426

(22) PCT Filed: Feb. 3, 2015

(86) PCT No.: PCT/AU2015/000054
§ 371 (c)(1),
(2) Date: Jul. 13, 2016

(87) PCT Pub. No.: WO2015/117184
PCT Pub. Date: Aug. 13, 2015

(65) Prior Publication Data
US 2016/0337986 A1    Nov. 17, 2016

(30) Foreign Application Priority Data

Feb. 4, 2014   (AU) ................................ 2014900324

(51) Int. Cl.
*H04W 72/00* (2009.01)
*H04W 52/28* (2009.01)
(Continued)

(52) U.S. Cl.
CPC ........ *H04W 52/281* (2013.01); *H04B 1/0035* (2013.01); *H04B 17/318* (2015.01);
(Continued)

(58) Field of Classification Search
CPC ....... H04W 52/28; H04W 4/06; H04W 76/00; H04W 4/22; H04B 1/0035; H04H 20/59
(Continued)

(56) References Cited

U.S. PATENT DOCUMENTS 5,635,921 A * 6/1997 Maxwell .............. G08G 1/0965
340/2.1
7,801,497 B1   9/2010 Lam
(Continued)

FOREIGN PATENT DOCUMENTS

JP        2007013426      1/2007
WO   PCT/EP1999/00242   10/1999
WO   PCT/AU2002/00796   12/2002

*Primary Examiner* — Huy C Ho
(74) *Attorney, Agent, or Firm* — Edwin D. Schindler

(57) ABSTRACT

There is disclosed an apparatus (10) for transmitting a communication signal across one or more pre-existing frequency channels or bands that carry a transmission signal. The apparatus comprises a memory for storing at least one pre-existing frequency channel or band together with information relating to a strength of the transmission signal carried by the at least one pre-existing frequency channel or band. A controller (24) is configured to generate a communication signal to be transmitted across at least one of the pre-existing frequency channels or bands at a strength sufficient to over-broadcast the transmission signal carried by said pre-existing channel or band. A mixer (26) is configured to receive each of the communication signals generated by the controller (24) and to combine said communication signals into a combined mixed communication signal (15). A transmitter (16) for transmitting the combined mixed communication signal (15) to be transmitted across the at least one pre-existing frequency channels or bands in replacement of, or in addition to, the transmission signal carried by the at least one pre-existing frequency channel.

13 Claims, 2 Drawing Sheets

(51) Int. Cl.
  *H04H 20/59* (2008.01)
  *H04W 4/06* (2009.01)
  *H04B 1/00* (2006.01)
  *H04B 17/318* (2015.01)
  *H04M 11/04* (2006.01)
  *H04W 40/00* (2009.01)
  *H04W 74/00* (2009.01)
  *H04W 4/90* (2018.01)

(52) U.S. Cl.
  CPC .............. *H04H 20/59* (2013.01); *H04W 4/06* (2013.01); *H04W 4/90* (2018.02)

(58) Field of Classification Search
  USPC ...................................................... 455/404.1
  See application file for complete search history.

(56) References Cited

U.S. PATENT DOCUMENTS

2006/0063490 A1   3/2006   Bader et al.
2009/0046624 A1   2/2009   Martinez et al.

\* cited by examiner

INFORMATION COMMUNICATION SYSTEM

CROSS-REFERENCE TO RELATED APPLICATIONS

This application is a continuation and national stage application of International Application, PCT/AU2015/000054, filed Feb. 3, 2015, which claims the benefit of Australian Patent Application No. 2014900324 filed on Feb. 4, 2014, the entire contents of both of which are hereby incorporated by reference.

FIELD OF INVENTION

This present invention relates to an information communication system for communicating information to individuals, and in particular, to an information communication system that can be used in a mobile or a stationary manner and which is able to selectively target individuals for communicating information thereto via a communication device.

BACKGROUND ART

The ability to provide effective communication systems for authorities or government bodies to communicate with the general population is fundamental to good governance and public safety. The type of information that is to be communicated across such communication systems may vary from general updates on changes to public services and the like, through to important information relating to potential disaster warnings and evacuation information. Whatever the type of information that is to be conveyed, the challenge resides in providing systems that enable the information to be targeted towards the relevant individual or groups of individuals, that require such information in a manner that can be received through normal communication devices in the possession of those target groups or individuals.

In this regard, a variety of broadcast systems have been proposed for this purpose, with varying degrees of success. A broadcast system that is able to indiscriminately broadcast a message over a wide area has the ability to communicate a message to a large population. However, in situations where the message may only be relevant to a small proportion of that population, such a broadcast system has the potential to cause undue concern and/or panic to those individuals to which the message is not relevant, which can hamper emergency services and create mass confusion across the general population. Another problem with many proposed broadcast systems is that they rely upon dedicated equipment to be purchased by the target individual(s) to receive and decipher the information being broadcast. Hence, without access to the appropriate equipment, some individual(s) are unable to receive and act upon the information being broadcast, greatly reducing the effectiveness of the system as a communication means for disseminating important information.

Further, as the need to broadcast information is often as a result of a catastrophic event or natural disaster, such as a bushfire, cyclone, tsunami, terrorist attack, or the like, most proposed communication systems are largely reliant upon the presence of a large amount of pre-existing infrastructure, such as transmission towers or mobile phone towers, to facilitate communication of the message. However, in the event of a natural disaster or the like, such infrastructure is often damaged or deemed ineffective, thereby significantly reducing the effectiveness of such systems to communicate important messages to the general population.

A system and apparatus for broadcasting a warning signal has been developed by the present Applicant and is disclosed in International PCT Patent Application No. PCT/AU2002/00796, the contents of which are incorporated herein by reference. This system is largely directed towards providing a means by which emergency vehicles are able to alert relevant individuals in the immediate or future vicinity of the vehicle of the presence of the emergency vehicle and to broadcast a pre-recorded message informing those targeted individuals of what they are to do via their radio or similar electronic device. Such a system and apparatus identifies all relevant radio channels in the immediate region surrounding the emergency vehicle and transmits a signal on each of those radio channels, the strength of the signal being sufficient to "over-broadcast" the relevant warning message on the radio channel for a predetermined distance, thereby alerting the relevant members of the population rather than all members of the population indiscriminately. Such a system is able to be controlled to target a desired group of the population or geographical area that may come into contact with the emergency vehicle and uses pre-existing devices, such as car and home radios, to deliver the message.

The Applicant's prior system referred to above has proven to be an effective means for transmitting an emergency vehicle message to individuals in the path of, or in the immediate vicinity of, the emergency vehicle. However, in the event of a natural disaster, such as a bushfire for example, there may be a need to transmit a variety of different messages across a variety of different regions of the population, depending upon the location of those individual(s) to the bushfire front. Such messages may vary from a general warning that advises individuals to take precautions and be alert of the presence of a fire; through to evacuation messages and other more immediate warnings. In such instances, it is fundamental to the safety of those individuals present in the relevant regions that they receive the most appropriate message from the originating message source, according to their circumstances, in order to carry out the appropriate action that is most relevant to their immediate needs. Further, as such systems are typically employed in remote regions, there is a need to provide a more efficient device that is of a size and configuration that is easily transportable for easy set-up and installation and which has low power requirements thereby obviating the need for the device to be reliant on an existing power supply.

Thus there is a need to provide an emergency warning system that is able to be used in a mobile manner for use with emergency vehicles and the like, as well as a fixed manner to provide roadside warnings and community regional warnings as required. There is also a need to provide an emergency warning system that can be simply and efficiently installed in location and which has the ability to provide personal warnings to individuals that may have special needs as a result of physical impairments or the like, such that a message can be broadcast to be received by a user's existing radio or personal electronic device, as required.

The above references to and descriptions of prior proposals or products are not intended to be, and are not to be construed as, statements or admissions of common general knowledge in the art. In particular, the above prior art discussion does not relate to what is commonly or well known by the person skilled in the art, but assists in the understanding of the inventive step of the present invention of which the identification of pertinent prior art proposals is but one part.

STATEMENT OF INVENTION

The invention according to one or more aspects is as defined in the independent claims. Some optional and/or preferred features of the invention are defined in the dependent claims.

Accordingly, in one aspect of the invention there is provided an apparatus for transmitting a communication signal across one or more pre-existing frequency channels or bands that carry a transmission signal comprising:
- a memory for storing at least one pre-existing frequency channel or band together with information relating to a strength of the transmission signal carried by the at least one pre-existing frequency channel or band;
- a controller configured to generate a communication signal to be transmitted across at least one of the pre-existing frequency channels or bands at a strength sufficient to over-broadcast the transmission signal carried by said pre-existing channel or band;
- a mixer configured to receive each of the communication signals generated by the controller and to combine said communication signals into a combined mixed communication signal; and
- a transmitter for transmitting the combined mixed communication signal to be transmitted across the at least one pre-existing frequency channels or bands in replacement of, or in addition to, the transmission signal carried by the at least one pre-existing frequency channel.

In one embodiment, the controller may comprise a multi-channel modulator device that generates the communication signal for each of the at least one of the pre-existing frequency channels or bands.

The controller may be configured to define one or more dedicated free channels or bands for transmitting the communication signal. The one or more dedicated free frequency channels or bands may not be associated with a pre-existing frequency channels or bands. The one or more dedicated free frequency channels or bands may be stored in the memory.

The multi-channel modulator may be a multi-channel digital modulator that functions as a software defined radio.

The mixer may comprise a multi-carrier combiner (MCC) that combines each of the communication signals into the combined mixed communication signal.

The transmitter may comprise an antenna for transmitting the combined mixed communication signal. The antenna may be further configured to receive one or more receiving signals for processing by the controller.

The controller may be configured to process the one or more receiving signals from the antenna and to identify the presence of any pre-existing frequency channels or bands that carry transmission signals present in the one or more receiving signals.

The controller may be configured to store the one or more identified pre-existing frequency channels or bands in the memory, together with a detected strength of the transmission signals carried by the one or more identified pre-existing frequency channels or bands.

Accordingly, in another aspect of the invention there is provided a method of transmitting a communication signal across one or more pre-existing radio channels comprising:
- establishing a frequency and signal strength of the one or more pre-existing frequency channels or bands;
- generating a communication signal for each said pre-existing frequency channel or band, the communication signal being configured to be over-broadcast on said pre-existing frequency channel or band to be received by a target audience;
- mixing the communication signal for each pre-existing frequency channel or band to generate a combined mixed communication signal; and
- transmitting the combined mixed communication signal across the one or more pre-existing frequency channels or bands.

The step of establishing a frequency and signal strength of the one or more pre-existing frequency channels or bands may comprise receiving a radio signal and analysing the received radio signal for the presence of a signal transmission across the one or more pre-existing frequency channels.

Each of the detected one or more pre-existing frequency channels or bands may be stored in a memory together with the detected signal strength of the signal transmission carried by the one or more detected more pre-existing frequency channels or bands.

BRIEF DESCRIPTION OF THE DRAWINGS

The invention may be better understood from the following non-limiting description of preferred embodiments, in which.

DETAILED DESCRIPTION OF THE DRAWINGS

Figure 1:
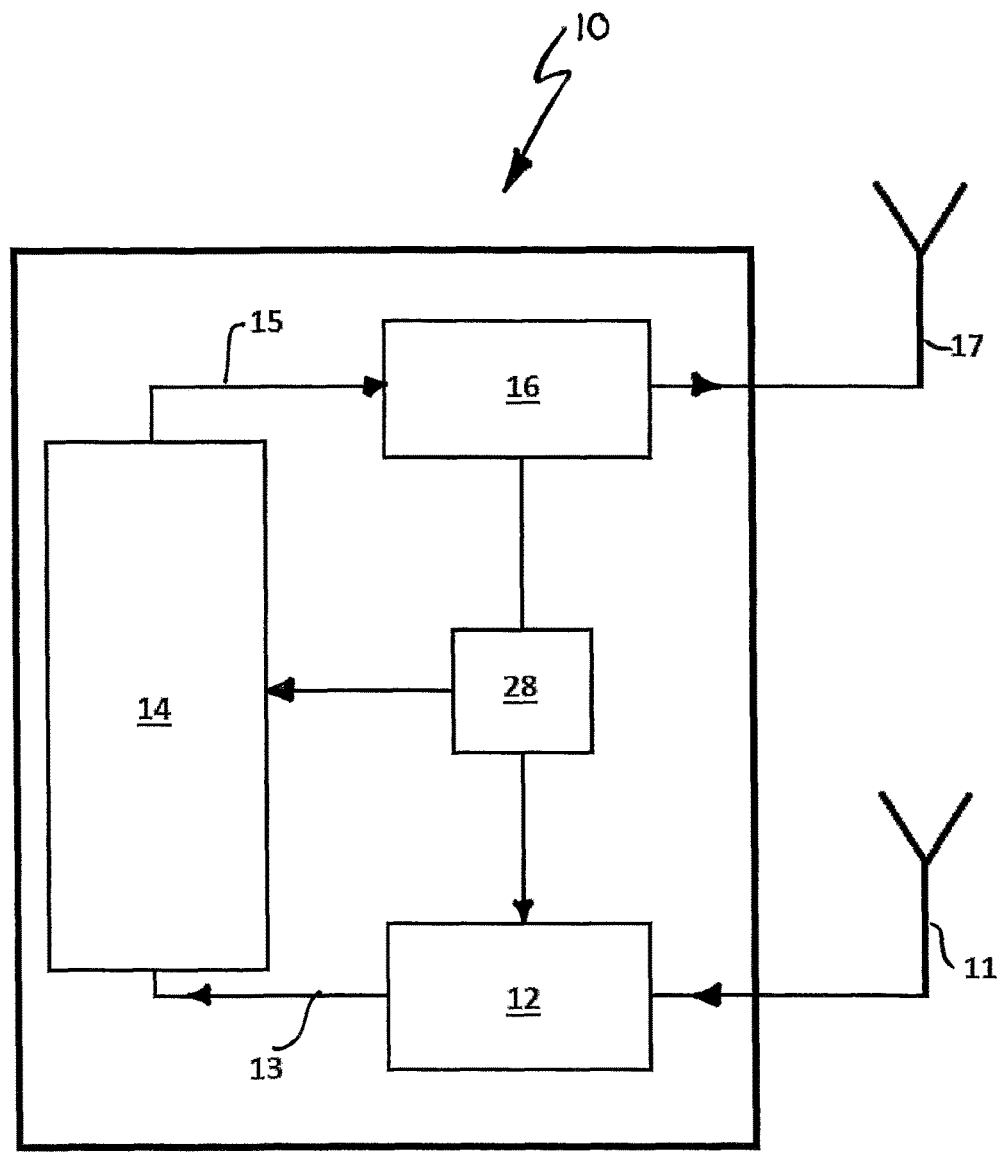
FIG. 1 is a block diagram depicting an apparatus according to an embodiment of the present invention.

Preferred features of the present invention will now be described with particular reference to the accompanying drawings. However, it is to be understood that the features illustrated in and described with reference to the drawings are not to be construed as limiting on the scope of the invention.

The present invention will be described below in relation to the application of a similar principle of operation to that described in the Applicant's earlier International PCT Application PCT/AU02/00796, the contents of which are incorporated herein by reference.

In this regard, the present invention is designed to broadcast a warning signal, typically a pre-recorded warning signal, across a number of pre-determined radio frequency bands or channels which may be received by targeted individuals in a predetermined broadcast region. It will be appreciated that the broadcast region may be any region of any predetermined size and is generally selected to identify a group of people to which the information that is being broadcast is directly relevant. This group of people could range from one or more individuals through to a population in excess of a million people, depending upon the specific message that is to be conveyed.

To broadcast a warning signal using the system and apparatus of the present invention, it is necessary that the system not only identifies any existing frequency bands or channels that may be transmitting signals in a specific region, such as an existing public or commercial radio channels, but also the strength of the transmission signal carried within that band or channel. The system and apparatus can then utilise this pre-existing frequency band or channel to broadcast an emergency signal at a power level greater than the normal strength of the signal associated with that channel or band to "over-broadcast" or "override" that signal, such that the warning signal will be heard in replacement of, or in addition to, the normal radio signal within a specific region. This region of transmission of the emergency signal is dependent upon the strength of the "over-broadcast" signal.

The system of the present invention is considerably different to prior art "radio jammer" technology, which generally transmits a message across all frequencies at a higher level such that the transmitted signal is received indiscriminately by all people, and not to a selected target audience, as is the case with the present invention. As will be appreciated by those skilled in the art, the present invention is also able to transmit individual warning messages at predetermined radio frequencies where no pre-existing radio signal has been previously detected. This enables individuals to nominate a specific frequency dedicated to broadcasting emergency signals that they may monitor constantly, at regular intervals, or in the event of an emergency, to receive warning signals associated with the emergency. It will be appreciated that the present invention is also able to provide a system for transmission of a signal at a predetermined power level irrespective of whether a pre-existing signal is detected or not.

Referring to FIG. 1, a schematic block diagram of an apparatus 10 for use in the information communication system of the present invention is depicted. The apparatus 10 generally comprises an antenna 11 for receiving or detecting the presence of a radio signal which is then processed by a receiver 12 to generate a detection signal 13 that is fed to a controller 14 for further processing.

The controller 14 is typically in the form of a microprocessor that analyses the detection signal 13 to identify the presence of any existing radio channels transmitting in the vicinity of the apparatus 10 and the strength of the signals being transmitted on each of the detected frequency channels or bands. The number of channels or bands detected is then stored within a memory provided in the controller 14, together with the measured strength of each signal. It will be appreciated that, in instances where the apparatus 10 is used in a fixed location, the analysis of the number of frequency channels or bands carrying signals and/or the strength of the signal carried by each channel or band need not be performed constantly. In such applications, such an analysis may be performed initially upon set-up of the apparatus and in some instances the apparatus 10 may have this information pre-stored in the memory of the controller 14, prior to use.

Irrespective of the manner in which the apparatus 10 is to be used, the controller 14 is firstly programmed with the details of the active frequency channels or bands that are broadcast in the region and the strength of the transmission signals carried by those frequency channels or bands. Then, upon receipt of a transmission signal from a remote location, or upon manual activation of the device by an emergency service or authority, the controller 14 is able to activate an emergency signal transmission function.

The emergency signal transmission function causes the controller 14 to generate a signal for transmission across each of the detected frequency channels or bands, as well as any other stored channel frequencies programmed within the controller 14, as will be discussed in more detail below. The signal 15 typically contains the information to be transmitted as well as data identifying the frequency channels or bands that are to carry the transmitted signal, and the strength of the signal that is to be transmitted. This signal 15 is then supplied to the transmitter 16 to broadcast the signal via antenna 17.

The signal 15 generated by the controller 14 is to be transmitted at a power level that is above the normal signal strength of the signal carried by the identified radio channel(s). The amount by which the power level exceeds the normal signal power level of the identified radio channel(s) will be determined by the controller 14 to ensure that the signal transmission distance is sufficient to reach the desired or targeted audience. The individuals within this transmission range can then tune their radio to their usual radio station or a dedicated emergency radio station or frequency channel and receive the message from the apparatus. Alternatively, if the individual has a personal channel stored within the controller 14 memory, the individual's personal device will be activated by the control signal to display or transmit the message directly to the individual.

Figure 2:
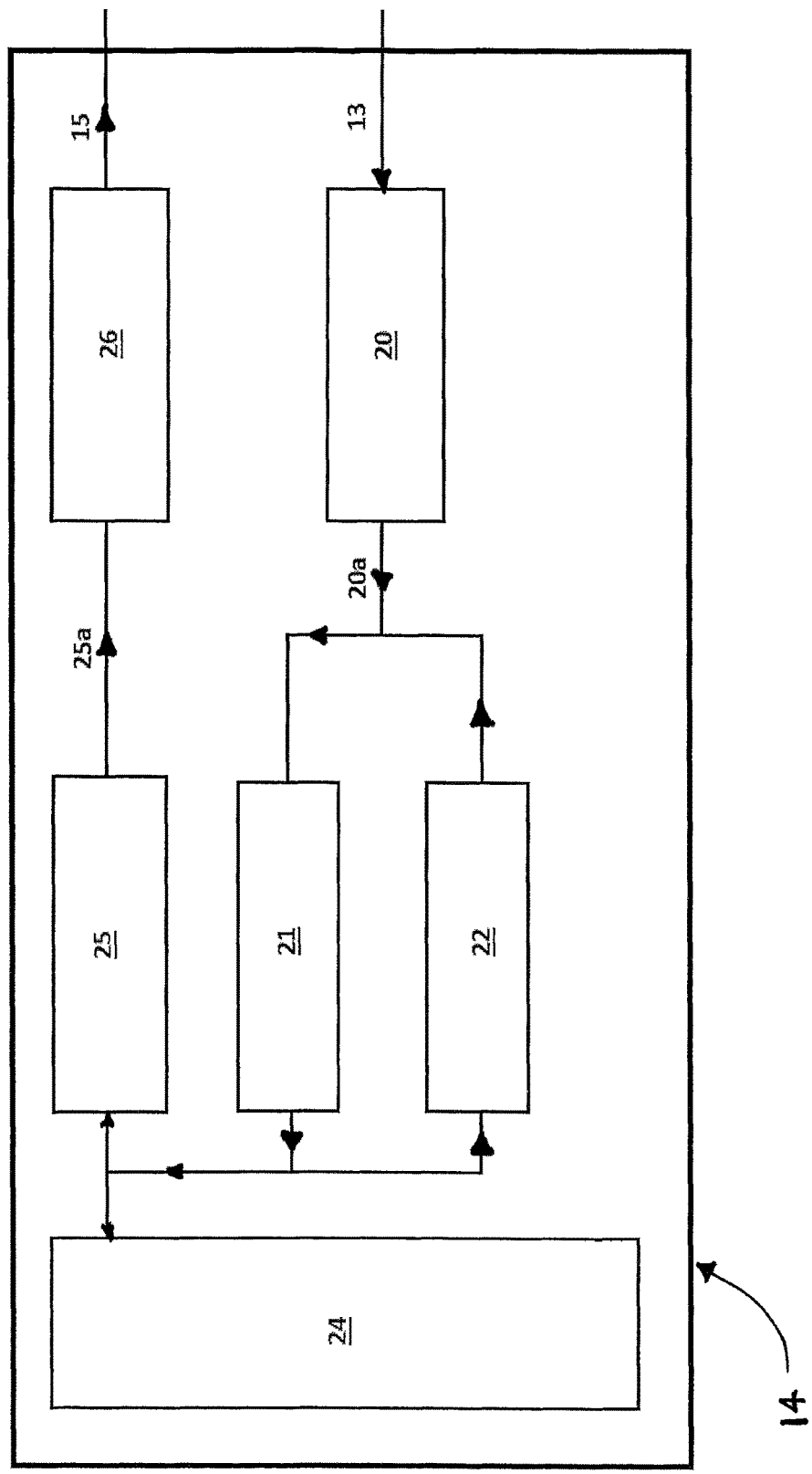
FIG. 2 is a block diagram depicting an arrangement of a controller for use in the apparatus of FIG. 1

The manner in which the controller 14 is configured to perform this emergency transmission function is depicted in FIG. 2.

As is depicted, the detection signal 13 is initially received by a filter 20, such as variable notch filter, that functions to remove any unwanted frequency components from the receiving signal 13 and enhance desired components, such as those frequency components relating to detected radio channels or frequencies. This filter 20 then produces an enhanced signal 20a that is fed into a spectrum analyser 21.

The Spectrum analyser 21 processes the enhanced signal 20a to measure the magnitude of the components of the enhanced signal against frequency over a full frequency range. By measuring the dominant frequency signals present in the enhanced signal 20a, the specific radio channels or bands that carry transmission signals in the vicinity of the apparatus are able to be identified and recorded, together with the magnitude or strength of the transmission signal carried within each detected channel or band. In order to provide a degree of feedback control and to cater for any undesirable shifts in frequency response, a loop gain compensator 22 may be provided, as shown.

The detected channel information is then stored in a non-volatile memory provided within the control computer 24. The control computer 24 may be configured to store a variety of information, together with pre-recorded messages or text as composed by the relevant controlling authority, and may be configured to interface with a variety of other systems such as location positioning systems, for example, GPS, Galileo or GLONASS systems, to facilitate remote command and control with fixed or radio telephony and data systems, where desired.

The control computer 24 may receive a signal to initiate transmission of a stored emergency signal across a predetermined target area. Such a signal may be transmitted by a remotely located emergency service or authority and may be received by antenna 11 and separately processed by the control computer 24. Upon receipt of the initiating emergency signal, the control computer may select the appropriate message from the stored messages and generate the associated emergency signal based upon the type of information to be transmitted and the breadth of coverage that is required.

A multichannel digital modulator 25, which may be in the form of a software defined radio, is able to process the emergency signal across each of the detected radio channels as well as any other predetermined channels stored within the control computer 24. Each of the signals generated are processed at a strength or power sufficient to achieve the desired coverage of the transmission from the apparatus in accordance with the initiation signal transmitted from the originating authority, as is described in the Applicant's International PCT Patent Application No. PCT/AU02/00796, and which will not be described in any further detail below. The processing technique described in this device results in the generation of a plurality of signals 25a across multiple frequencies.

Conventionally, each baseband signal present in the plurality of signals 25a has been combined through a conventional combiner before being sent to the transmitter for transmission via an antenna. However, each time a signal is combined in this manner there are power losses resulting in the need to increase power transmission. This typically results in multiple DACs and power amplifiers per channel being required to compensate for such losses, which requires more system componentry that can significantly increase the cost and overall size of the apparatus.

Instead, in the present invention as is shown in FIG. 2, each of the signals 25a are received by a multi-carrier combiner (MCC) 26. The MCC 26 combines each of the individual signals 25a into a combined mixed transmission signal which is then able to be amplified and transmitted simultaneously as mixed signal 15. This mixed signal 15 is then able to be supplied to the transmitter 16 for transmission by the antenna 17. Alternatively, the system of the present invention may be constructed such that the transmission antenna 17 and the detection antenna 11 are combined as a single two-way antenna capable of both detecting and transmitting radio frequency signals.

It will be appreciated that the controller 14 of the present apparatus is able to define new channels for broadcast of the emergency signal as well as utilise existing channels for distribution of the warning signal via an over-broadcasting system. The controller 14 is also configured to interface with other media, such as mobile phones and the like, to provide additional functionality where required. Such a system is able to be installed in a fixed or mobile application for use in a variety of different applications as required.

As is depicted in FIG. 1, the apparatus 10 may comprise a power supply 28 that provides power to the device as required. The power supply may be connected to the power grid or may be off-grid and powered by a battery or replenishable power source.

It will be appreciated that the apparatus of the present invention may be mounted in an emergency vehicle, combined within a permanent structure or incorporated within a trailer or similar device that can be positioned at a site when required. Irrespective of how the apparatus is installed for use, the configuration of the device provides a simple means by which the device can readily detect available frequency channels or bands that carry data, so that an emergency message can be broadcast across these existing channels or bands where necessary to disseminate an emergency message to a target audience.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

It will be appreciated by those skilled in the art that many modifications and variations may be made to the methods of the invention described herein without departing from the spirit and scope of the invention.

The claims defining the invention are as follows:

1. An apparatus for transmitting a communication signal across a plurality of pre-existing frequency channels or bands that carry a transmission signal, the apparatus comprising:
   a memory for storing a plurality of pre-existing frequency channels or bands together with information relating to a strength of the transmission signal carried by the plurality of pre-existing frequency channels or bands;
   a controller configured to generate communication signals for transmission across each of a selection of pre-existing frequency channels or bands at a strength sufficient to over-broadcast the transmission signal carried by said pre-existing channel or band;
   a mixer configured to receive each of the communication signals generated by the controller for each of the selection of pre-existing frequency channels or bands and to combine each of the communication signals into a single combined communication signal; and
   a transmitter for transmitting the single combined communication signal to be transmitted simultaneously across the selection of pre-existing frequency channels or bands in replacement of, or in addition to, the transmission signal carried by the selected pre-existing frequency channel.

2. An apparatus according to claim 1, wherein the controller comprises a multi-channel modulator device that generates the communication signals for each of the selection of pre-existing frequency channels or bands.

3. An apparatus according to claim 2, wherein the controller is configured to define one or more dedicated free channels or bands for transmitting the communication signal, the one or more dedicated free frequency channels or bands not being associated with a pre-existing frequency channel or band.

4. An apparatus according to claim 3, wherein the one or more dedicated free frequency channels or bands are stored in the memory.

5. An apparatus according to claim 2, wherein the multi-channel modulator is a multi-channel digital modulator that functions as a software defined radio.

6. An apparatus according to claim 1, wherein the mixer comprises a multi-carrier combiner (MCC) that combines each of the communication signals into the single combined communication signal.

7. An apparatus according to claim 1, wherein the transmitter comprises an antenna for transmitting the single combined communication signal.

8. An apparatus according to claim 7, wherein the antenna is further configured to receive one or more receiving signals for processing by the controller.

9. An apparatus according to claim 8, wherein the controller is configured to process the one or more receiving signals from the antenna and to identify the presence of any pre-existing frequency channels or bands that carry transmission signals present in the one or more receiving signals.

10. An apparatus according to claim 9, wherein the controller is configured to store the one or more identified pre-existing frequency channels or bands in the memory, together with a detected strength of the transmission signals carried by the one or more identified pre-existing frequency channels or bands.

11. A method of transmitting a communication signal across a plurality of pre-existing radio channels comprising:
   establishing a frequency and signal strength of the plurality of pre-existing frequency channels or bands;

generating communication signals for each of a selection of pre-existing frequency channels or bands, the communication signals being configured to be over-broadcast on each of the selection of pre-existing frequency channels or bands to be received by a target audience;

mixing the communication signals to be over-broadcast on each of the selection of pre-existing frequency channels or bands to generate a single combined communication signal; and transmitting the single combined communication signal simultaneously across the selection of pre-existing frequency channels or bands.

12. A method according to claim 11, wherein the step of establishing a frequency and signal strength of the plurality of pre-existing frequency channels or bands comprises receiving a radio signal and analysing the received radio signal for the presence of a signal transmission across the one or more pre-existing frequency channels.

13. A method according to claim 12, further comprising a step of storing each of the detected plurality of pre-existing frequency channels or bands in a memory together with the detected signal strength of the signal transmission carried by the detected plurality of pre-existing frequency channels or bands.

* * * * *